Sept. 19, 1961 A. U. BRYANT 3,000,610
VALVE CONSTRUCTION
Filed Oct. 13, 1958 3 Sheets-Sheet 1
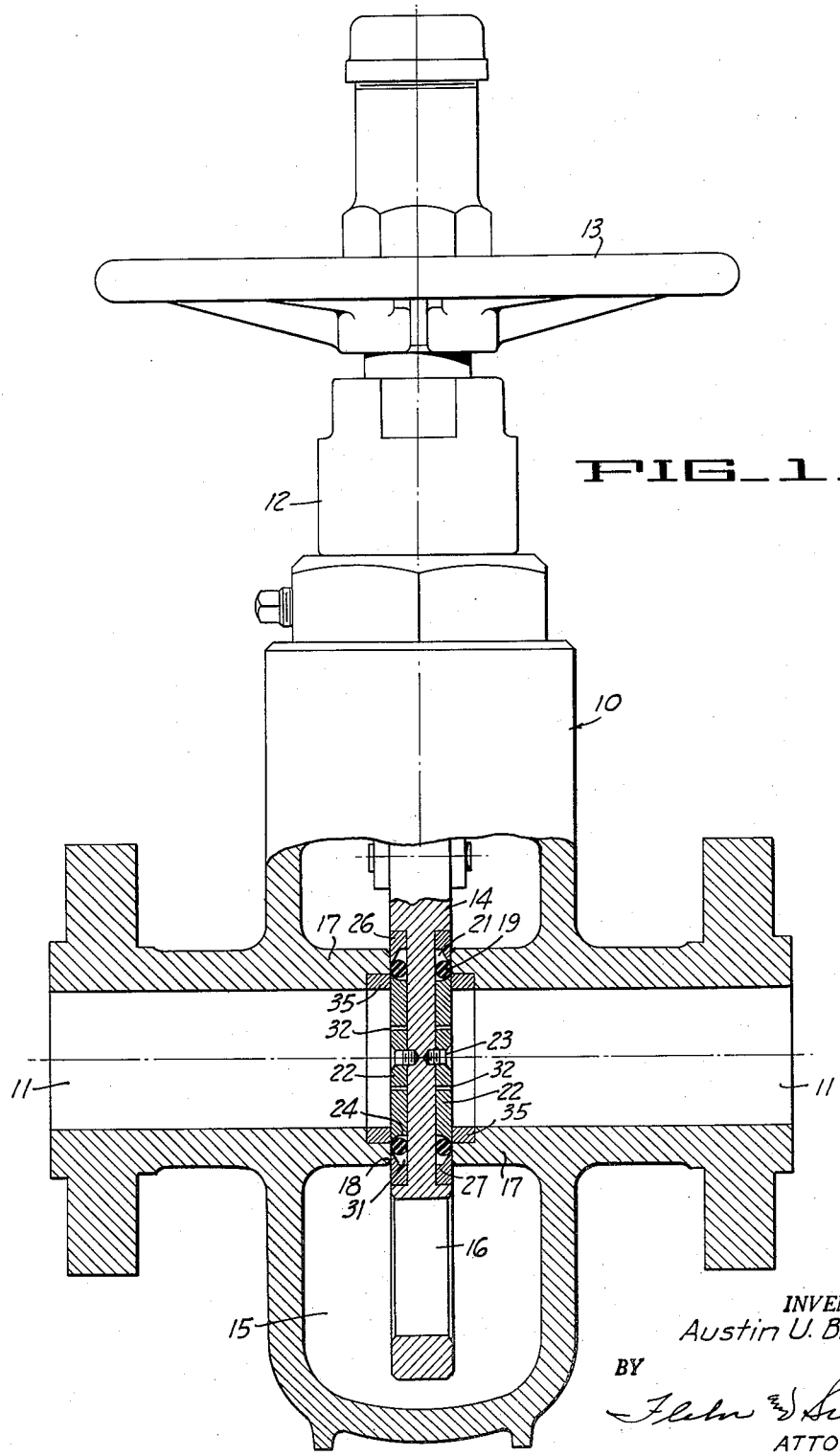
FIG_1_
INVENTOR.
Austin U. Bryant
BY
ATTORNEYS

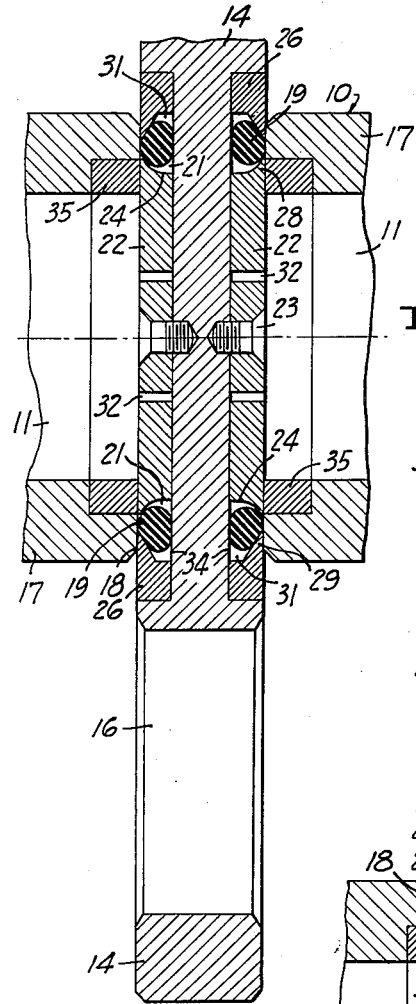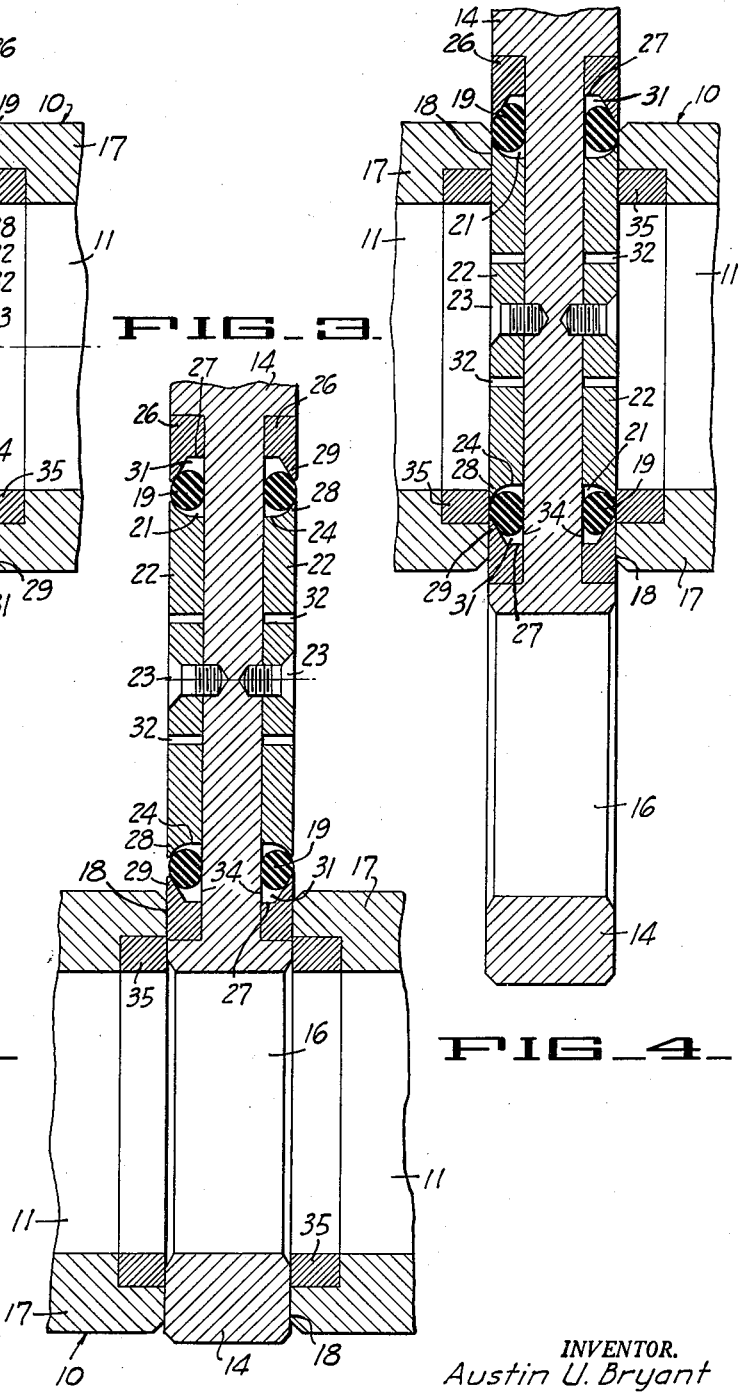

Sept. 19, 1961  A. U. BRYANT  3,000,610
VALVE CONSTRUCTION
Filed Oct. 13, 1958  3 Sheets-Sheet 3
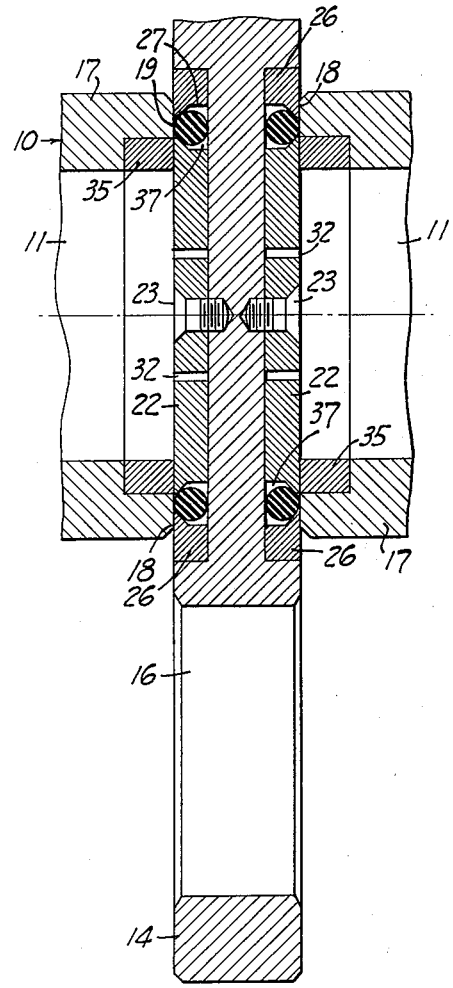
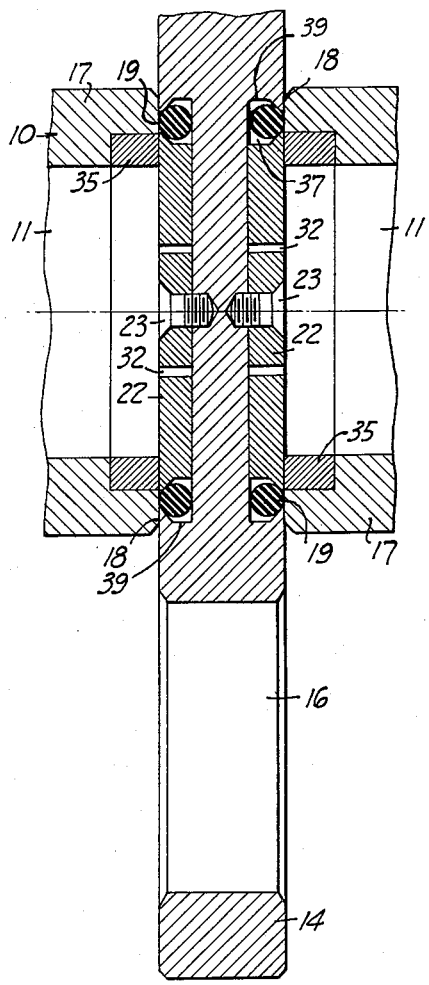
INVENTOR.
Austin U. Bryant
BY
ATTORNEYS

3,000,610
VALVE CONSTRUCTION

Austin U. Bryant, Walnut Creek, Calif., assignor to Grove Valve & Regulator Co., Oakland, Calif., a corporation of California
Filed Oct. 13, 1958, Ser. No. 767,047
4 Claims. (Cl. 251—327)

This invention relates generally to valves of the gate type suitable for controlling flow of various fluids, including gases and liquids.

Resilient seal rings of the O-ring type have been used in various types of valves to provide fluid-tight seals. Particularly reference is made to my Patents 2,713,989 and 2,810,543 showing O-ring valves of the gate type. As shown in FIGURE 2 of Patent 2,810,543, the main sealing O-rings may be carried by seat rings, which in turn are carried by adjacent portions of the valve body. Assuming the use of a ported gate, this arrangement is desirable in that the O-rings wipe over the sides of the gate during movements between open and closed positions, thus providing a self-cleaning feature. However, the separate mounting of the O-rings upon portions of the body complicates initial assembly and field repair, because the O-rings and their cooperating mounting parts must be assembled within the body, before the gate is placed in its operating position. Likewise, when making repairs, the gate must be removed, and thereafter the O-rings removed.

In general, it is an object of the present invention to provide a novel gate valve construction which incorporates O-ring sealing means on the gate, rather than on the valve body.

Another object of the invention is to provide an O-ring type of gate valve which facilitates O-ring replacement.

Another object of the invention is to provide a valve of the above character in which the mounting means for the O-rings can be simplified and made less expensive.

Further objects and features of the invention will appear from the following description in which the preferred embodiments have been set forth in detail in conjunction with the accompanying drawing.

Referring to the drawing:

FIGURE 1 is a side elevational view, partly in section, illustrating a gate valve incorporating the present invention.

FIGURE 2 is an enlarged cross-sectional detail illustrating the sealing means and gate construction incorporated in FIGURE 1.

FIGURE 3 is a view like FIGURE 2, but showing the valve gate in full open position.

FIGURE 4 is an enlarged cross-sectional detail illustrating the gate being moved from full closed toward open position.

FIGURE 5 is an enlarged cross-sectional detail showing a modification in which the O-rings form pressure holding seals upon both the upstream and downstream sides of the gate.

FIGURE 6 is an enlarged cross-sectional detail showing another modification in which the formation of the O-ring accommodating recess is simplified.

The valve shown in FIGURE 1 of the drawing is similar to that illustrated in my Patent 2,810,543. It consists of a body 10 having flow passages 11 adapted to connect with associated piping. An operating stem extends through the bonnet 12 and is connected with suitable operating means, including the hand wheel 13. The valve gate 14 is disposed within a body space 15 between the flow passages. By turning the hand wheel, the gate is raised or lowered between full open and closed positions. In this instance, the gate is provided with a port 16 adapted to register with the passages 11 for full open position of the valve. The annular portions 17 on opposite sides of the gate are formed as rigid portions of the body and provide opposed surfaces 18 adapted to seat the adjacent side surfaces of the gate.

The gate is provided with a mounting means serving to carry the resilient seal rings 19 of the O-ring type. The mounting means forms recesses 21, within which the O-rings are accommodated, and in addition incorporates features tending to prevent O-ring dislodgment. In this particular embodiment the mounting means includes the disc like members 22, which are removably attached to opposite sides of the gate by suitable means such as the screws 23. The outer periphery 24 of each member 22 forms the inner defining surface for the corresponding recess 21. Additional annular members 26 are set within the sides of the gate and are secured thereto by suitable means (not shown). The inner peripheral surfaces 27 of members 26 form the outer defining surfaces of the recesses 21. The members 22 and 26 for each side of the gate, are dimensioned whereby their outer surfaces are coincident with the sides of the gate, or in other words, whereby both sides of the gate have planar continuity.

The surfaces defining the recesses 21 are shaped to provide the annular lips 28 and 29 which are spaced apart sufficiently far to permit the corresponding O-ring to have sealing contact with the adjacent surfaces 18. These lips serve as mechanical means for retaining the O-rings. In addition, the shaping of the recesses is such as to provide the outer recess extensions 31. As will be presently explained, these recess extensions provide a function similar to that disclosed and claimed in said co-pending applications.

Each of the recess extensions has pressure equalizing communication with both the corresponding body passage and the body space. Thus the members 22 are provided with ducts 32, which together with the mechanical clearance between each disc and the gate, serves to establish pressure equalizing communication between the inner corner of the corresponding recess and the valve passage. Members 26 are likewise fitted in such a manner as to establish communication between the outer corners of the recesses 21 and the body, in other words, between the recess extensions 31 and the body space. The dimensioning of the recesses together with the spacing between surfaces 18 is such that when the gate is closed, the O-rings are somewhat squeezed between the surfaces 34 of the recess, and the surfaces 18.

In addition to the parts described above, it is desirable to provide the inner seat rings 35. These seat rings are loosely fitted whereby some fluid leakage may occur past the same under certain operating conditions.

Operation of my valve is as follows:

Assuming that the valve is closed and fluid pressure is applied to one side of the same, a seal is established between the gate and the body. That O-ring upon the downstream side holds the fluid pressure differential, because any fluid pressure differential applied to the upstream O-ring tends to squeeze it into the recess extension 31, with the result that under such conditions its sealing contact with the surface 18 is broken. Assuming now that one commences to move the gate towards open position, the initial part of such movement shifts a part of each O-ring into contact with portions of the rings 35 whereby fluid pressure in the accommodating recess 21 on the downstream side of the gate is permitted to equalize with the downstream pressure, before any substantial part of the downstream O-ring is exposed for dislodgment from its accommodating recess. Communication of the outflow passage through the ducts 32, likewise contributes to pressure equalization and tends to prevent O-ring dislodgment. As movement of the gate continues toward full open position, both the upstream and downstream O-rings are moved out of contact with the seating surfaces 18 and the rings 35. However immediately before the port 16 has been brought into partial registry with the passages 11, restricted flows occur between the annular members 26 and the adjacent surfaces 18.

It will be evident from the foregoing that my gate valve makes possible effective fluid type sealing by virtue of O-ring sealing action, while at the same time facilitating O-ring replacement. The valve is suitable for relatively high pressure service, as for example pressures of the order of 1000 p.s.i. or more.

If desired, the feature of providing the recess extensions 31 can be omitted with the result that pressure holding seals are established upon both sides of the gate. Such a construction is shown in FIGURE 5. In this instance, the O-ring accommodating recesses 37 are formed between members 22 and 26, and in section the recesses have a configuration as disclosed in my Patent 2,810,543. The recesses have pressure equalizing communication with the body space and the body passages, in the same manner as previously described.

As shown in FIGURE 6 it is possible to further modify my valve by omitting the annular members 26. In this event, the outer defining surfaces 39 for the recesses are formed by machining the gate rather than by a separate annular member as in FIGURES 1 to 5. Mechanical retention of the O-rings, plus the use of O-rings of proper hardness, is relied upon together with the venting 32 to prevent O-ring dislodgment.

Various resilient materials can be used for the O-rings, the selection depending somewhat on operating conditions. For example, I can use such synthetic rubbers as Hycar or neoprene, with a hardness of the order of 70 to 100 durometers. Also other elastomers can be used, such as nylon or Teflon, which are more resistant to certain chemicals, and somewhat harder than the hardness values just mentioned.

The present application is a continuation-in-part of my copending application Serial No. 579,184, filed April 19, 1956 for "Valve Construction" (now issued as Patent 2,950,897), and which in turn was a continuation-in-part of my application Serial No. 331,839, filed January 19, 1953, for "Valve Construction" (now abandoned).

I claim:

1. In a valve construction, a body having aligned flow passages and a space located between the passages, a valve gate disposed within the body space and movable between open and closed positions relative to the passages, seating means carried by the body and adapted to seat upon the side surfaces of the gate in annular areas surrounding the passages, resilient seal rings of the O-ring type disposed upon opposite sides of the gate, and means defining recesses for mounting and loosely retaining the O-rings on the sides of the gate, said means including inner and outer annular members carried by the sides of the gate, said outer annular members having inner peripheral surfaces forming the outer peripheral defining surfaces of said recesses and being formed to provide pressure equalizing communication between the recesses and the body space when the valve is in closed position, said inner annular members having outer peripheral surfaces forming the inner peripheral defining surfaces of said recesses and being formed to provide pressure equalizing communication between the corresponding recess and the corresponding associated body passage when the valve is in closed position.

2. A valve as in claim 1 in which the portions defining said recesses provide radially spaced annular lips to aid retention of the O-rings on the gate.

3. In a valve construction: a body having aligned flow passages and a body space located between said passages; a valve gate disposed within said body space and movable between open and closed positions relative to said passages; seating means carried by said body and adapted to seat upon the side surfaces of said gate in annular areas surrounding said passages; resilient seal rings of the O-ring type disposed upon opposite sides of said gate; and means defining recesses for mounting and loosely retaining said O-rings on the sides of said gate, said means including annular members carried by the sides of said gate and having outer peripheral surfaces forming the inner peripheral defining surfaces of said recesses, said annular members being each formed to provide pressure equalizing communication between the corresponding recess and the corresponding associated passage when said valve is in closed position, said seating means carried by said body including annular members loosely fitted within said body and each having an outer diameter slightly less than the diameter of said O-rings, each loosely fitted annular member having a flat end surface substantially contiguous with the corresponding seating surface of said body.

4. In a valve construction: a body having aligned flow passages and a body space located between said passages; a flat valve gate having parallel sides disposed within said body space and movable between open and closed positions relative to said passages; seating means carried by said body and adapted to seat upon the side surfaces of said gate in annular areas surrounding said passages; resilient seal rings of the O-ring type disposed upon opposite sides of said gate; and means defining recesses for mounting and loosely retaining said O-rings on the sides of said gate, said means including flat annular members removably disposed within corresponding gate recesses on opposite sides of said gate and having outer peripheral surfaces forming the inner peripheral defining surfaces of said recesses, said annular members being each formed to provide pressure equalizing communication between the corresponding recess and the corresponding associated passage when said valve is in closed position.

References Cited in the file of this patent

UNITED STATES PATENTS

| | | |
|---|---|---|
| 2,401,377 | Smith | June 4, 1946 |
| 2,433,732 | Brown | Dec. 30, 1947 |
| 2,604,293 | Phillips | July 22, 1952 |
| 2,674,436 | Jones | Apr. 6, 1954 |
| 2,688,975 | Born | Sept. 14, 1954 |
| 2,704,650 | Rand | Mar. 22, 1955 |